(12) United States Patent
Berruet et al.

(10) Patent No.: US 11,519,461 B2
(45) Date of Patent: Dec. 6, 2022

(54) SENSOR BEARING UNIT AND ASSOCIATED MANUFACTURING METHOD

(71) Applicant: Aktiebolaget SKF, Gothenburg (SE)

(72) Inventors: Nicolas Berruet, Artannes sur Indre (FR); Charles Chambonneau, Ballan Miré (FR); Eric Robert, Saint Cyr sur Loire (FR); Vincent Sausset, Azay-le-Rideau (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/402,698

(22) Filed: Aug. 16, 2021

(65) Prior Publication Data

US 2022/0099144 A1 Mar. 31, 2022

(30) Foreign Application Priority Data

Sep. 28, 2020 (DE) .......................... 102020125222.6

(51) Int. Cl.
| | |
|---|---|
| *F16C 19/06* | (2006.01) |
| *F16C 41/00* | (2006.01) |
| *G01P 3/44* | (2006.01) |
| *F16C 33/58* | (2006.01) |
| *G01P 3/487* | (2006.01) |

(52) U.S. Cl.
CPC ............ *F16C 41/007* (2013.01); *F16C 19/06* (2013.01); *F16C 33/586* (2013.01); *G01P 3/443* (2013.01); *G01P 3/487* (2013.01); *F16C 2226/76* (2013.01); *F16C 2226/80* (2013.01); *F16C 2326/02* (2013.01)

(58) Field of Classification Search
CPC ...... F16C 19/06; F16C 33/586; F16C 41/007; F16C 2226/76; F16C 2226/80; G01P 3/443; G01P 3/487
See application file for complete search history.

(56) References Cited

U.S. PATENT DOCUMENTS

| 10,132,359 | B2 | 11/2018 | Chaussat | |
|---|---|---|---|---|
| 2006/0170414 | A1* | 8/2006 | Vignotto | ................. G01P 3/443 324/174 |
| 2018/0128320 | A1* | 5/2018 | Chaussat | .................. G01D 5/12 |

FOREIGN PATENT DOCUMENTS

| FR | 2898949 A1 * | 9/2007 | ............ F16C 41/007 |
|---|---|---|---|
| FR | 3052202 B1 | 11/2018 | |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A sensor bearing unit includes a bearing having a first ring and a second ring, and an impulse ring provided with a target holder, with a target mounted on the target holder, and with a sleeve secured to the first ring, the target holder being axially mounted between a lateral face of the first ring and the sleeve. The first ring having at least one anti-rotation feature cooperating with at least one complementary anti-rotation feature formed on the impulse ring so as to prevent angular movement of the impulse ring relative to the first ring.

10 Claims, 7 Drawing Sheets

SENSOR BEARING UNIT AND ASSOCIATED MANUFACTURING METHOD

CROSS-REFERENCE TO RELATED APPLICATIONS

This application claims priority to German Patent Application no. 102020125222.6, filed Sep. 28, 2020, the contents of which is fully incorporated herein by reference.

TECHNICAL FIELD OF THE INVENTION

The present invention relates to a sensor bearing unit comprising a bearing and an impulse ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing. The magnetic target is attached to an outer tubular portion of the target holder.

In a first type of impulse ring, the target holder is also provided with an inner tubular portion secured into an annular groove made in the bore of the inner ring in order to prevent the rotation of the impulse ring relative to the inner ring. To this end, the target holder is radially crimped into the annular groove of the inner ring.

In a second type of impulse ring, the impulse ring is also provided with a fixing sleeve supporting the target holder and secured to the inner ring. The sleeve comprises an annular axial portion and a radial collar extending radially outwards the axial portion, the target holder being axially mounted between the inner ring of the bearing and the radial collar of the sleeve. For more details, it is possible for example to refer to the U.S. Pat. No. 10,132,359.

Similarly, to the first type of impulse ring, the axial portion of the sleeve is secured into the annular groove of the inner ring in order to prevent the rotation of the impulse ring relative to the inner ring.

It is essential that the impulse ring is fixedly connected in rotation with the bearing ring to which it is attached.

In some cases, due to high speeds, thermal dilatation or high mechanical loads, there is a significant risk that the angular mechanic connection between the impulse ring and the bearing ring holding it becomes partially or totally loose, permanently, or randomly. Should such a failure occur, the signal measured by the detection means would not correspond to the real position or speed or acceleration of one of the two bearing rings with respect to the other.

One aim of the present invention is to provide a sensor bearing unit with improved angular connection between the impulse ring and the associated ring.

SUMMARY OF THE INVENTION

The invention relates to a sensor bearing unit comprising a bearing provided with a first ring and a second ring centered on an axis, and an impulse ring provided with a target holder, with a target mounted on the target holder, and with a sleeve secured to the first ring of the bearing.

The target holder is axially mounted between a lateral face of the first ring of the bearing and the sleeve.

According to a first general feature, the first ring of the bearing comprises anti-rotation means cooperating with complementary anti-rotation means of the impulse ring so as to prevent angular movement of the impulse ring relative to the first ring.

According to a second general feature, the anti-rotation means of the first ring of the bearing are formed on the lateral face of the first ring, and/or extend from the lateral face.

According to a third general feature, the complementary anti-rotation means of the impulse ring extend into the anti-rotation means of the first ring. Alternatively, the anti-rotation means of the first ring may extend into the complementary anti-rotation means of the impulse ring.

Preferably, both the anti-rotation means of the first ring of the bearing and the complementary anti-rotation means of the impulse ring extend in the circumferential direction over a limited angular sector. In other words, the anti-rotation means of the first ring and the impulse ring are not annular. Accordingly, any relative rotation between the impulse ring and the first ring is prevented by abutment in circumferential direction.

The sleeve of the impulse ring may comprise a mounting portion secured to the first ring of the bearing, and a collar extending radially outwards the mounting portion. The target holder is axially mounted between the lateral face of the first ring of the bearing and the collar of the sleeve.

In one embodiment, the mounting portion of the sleeve extends purely axially.

A radial gap may subsist between the bore of the target holder of the impulse ring and the sleeve.

According to a first design, the anti-rotation means of the first ring of the bearing comprise at least one anti-rotation recessed portion.

In one embodiment, the anti-rotation recessed portion of the first ring of the bearing comprises at least one slot formed on the lateral face of the first ring, the target holder of the impulse ring comprising at least one lug extending into the slot, the lug forming at least partly the complementary anti-rotation means of the impulse ring. The slot and lug may extend axially. Alternatively, the slot and lug may extend obliquely.

In another embodiment, the anti-rotation recessed portion of the first ring of the bearing comprises at least one axial groove extending from the lateral face of the first ring axially along a cylindrical surface of the first ring, the sleeve comprising at least one boss extending into the axial groove and being of complementary shape, the boss forming at least partly the complementary anti-rotation means of the impulse ring. The anti-rotation recessed portion of the first ring may comprise a plurality of axial grooves spaced apart in the circumferential direction, the sleeve comprising a plurality of bosses each extending into one of the axial grooves.

Alternatively, or in combination, the anti-rotation recessed portion of the first ring of the bearing may comprise at least one radial groove formed on the lateral face of the first ring, the target holder comprising at least one boss extending into the radial groove and being of complementary shape, the boss forming at least partly the complementary anti-rotation means of the impulse ring. The anti-rotation recessed portion of the first ring may comprise a plurality of radial grooves spaced apart in the circumferential direction, the sleeve comprising a plurality of bosses each extending into one of the radial grooves.

In another embodiment, the anti-rotation recessed portion of the first ring of the bearing may comprise an eccentric groove formed on the lateral face of the first ring, the target holder comprising an eccentric rib extending into the eccentric groove and being of complementary shape, the eccentric rib forming at least partly the complementary anti-rotation means of the impulse ring.

According to a second design, the anti-rotation means of the impulse ring comprise at least one anti-rotation recessed portion.

In one embodiment, the anti-rotation recessed portion of the impulse ring comprises at least one slot formed on the target holder, the lateral face of the first ring of the bearing comprising at least one lug extending from the lateral face into the slot. The slot and lug may extend axially. Alternatively, the slot and lug may extend obliquely.

In another embodiment, the anti-rotation recessed portion of the impulse ring comprises at least one axial groove extending along a cylindrical surface of the sleeve, the first ring of the bearing comprising at least one boss extending into the axial groove and being of complementary shape, the boss extending from the lateral face of the first ring.

Alternatively, or in combination, the anti-rotation recessed portion of the impulse ring comprise at least one radial groove formed on the target holder, the lateral face of the first ring of the bearing comprising at least one boss extending into the radial groove and being of complementary shape, the boss extending from the lateral face of the first ring.

In another embodiment, the anti-rotation recessed portion of the impulse ring may comprise an eccentric groove formed on target holder, the lateral face of the first ring of the bearing comprising an eccentric rib extending into the eccentric groove and being of complementary shape, the eccentric rib extending from the lateral face of the first ring.

The invention also relates to a sensor bearing unit comprising a bearing provided with a first ring and a second ring centered on an axis, and an impulse ring provided with a target holder, with a target mounted on the target holder, and with a sleeve secured to the first ring of the bearing.

The target holder is axially mounted between a lateral face of the first ring of the bearing and the sleeve.

According to a first general feature, the first ring of the bearing comprises anti-rotation means cooperating with complementary anti-rotation means of the impulse ring so as to prevent angular movement of the impulse ring relative to the first ring.

According to a second general feature, the anti-rotation means of the first ring of the bearing and the anti-rotation means of the impulse ring extend in the circumferential direction over a limited angular sector.

According to a third general feature, the anti-rotation means of the impulse ring extend into the anti-rotation means of the first ring. Alternatively, the anti-rotation means of the first ring may extend into the anti-rotation means of the impulse ring.

The invention further relates to a method for manufacturing a sensor bearing unit as previously defined, wherein the sleeve is secured to the first ring only by axial press-fitting.

In one embodiment, the anti-rotation means of the impulse ring, or the anti-rotation means of the first ring, may be formed during the step of axial press-fitting.

BRIEF DESCRIPTION OF THE DRAWINGS

The present invention and its advantages will be better understood by studying the detailed description of specific embodiments given by way of a non-limiting examples and illustrated by the appended drawings on which.

DETAILED DESCRIPTION OF THE INVENTION

Figure 1:
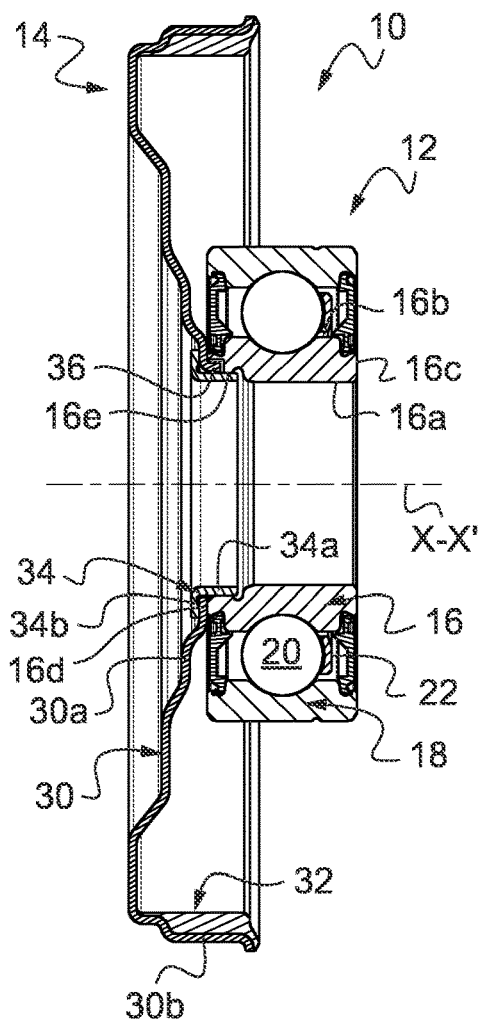
FIG. 1 is an axial section view of a sensor bearing unit according to a first example of the invention.

The sensor bearing unit 10 represented on FIG. 1 is adapted to equip an apparatus such as a motor, a brake system, a suspension system or any rotating machine, in particular for an automotive vehicle.

The sensor bearing unit 10 comprises a bearing 12 and an impulse ring 14 mounted on the bearing.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is intended to be mounted on a shaft of the apparatus for tracking the rotation of the shaft. The inner ring 16 is intended to rotate while the outer ring 18 is intended to be fixed. The outer ring 18 can be mounted in a fixed support member or housing, belonging to the apparatus.

The inner ring 16 comprises a cylindrical inner surface or bore 16a and an outer cylindrical surface 16b which is radially opposite to the bore 16a. A toroidal circular raceway for the rolling elements 20 is formed from the outer cylindrical surface 16b, the raceway being directed radially outwards.

The inner ring 16 also comprises two opposite radial lateral faces 16c, 16d which axially delimit the bore 16a and the outer surface 16b of the ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 30, a target 32 mounted on the target holder, and a fixing sleeve 34 secured to the inner ring 16.

The target holder 30 is axially secured to the inner ring 16 of the bearing by means of the sleeve 34. The target holder 30 is axially mounted between the lateral face 16d of the inner ring of the bearing and the sleeve 34. The target holder 30 is mounted radially around the sleeve 34. The target holder 30 is axially interposed and clamped between the lateral face 16d of the inner ring and the sleeve 34. The target holder 30 is in axial contact against the lateral face 16d of the inner ring on one side and in axial contact with the sleeve 34 on the other side.

The target holder 30 comprises an annular radial portion 30a defining the bore of the target holder, and an outer annular axial portion 30b radially surrounding the bearing 12. The outer axial portion 30b is located radially above the outer ring 18 of the bearing. The outer axial portion 30b extends radially a large-diameter edge of the radial portion 30a.

The radial portion 30a of the target is axially interposed and clamped between the lateral face 16d of the inner ring of the bearing and the sleeve 34. In the illustrated example, the radial portion 30a of the target holder is provided with frustoconical parts inclined with respect to the axis X-X' towards the opposite direction of the bearing 12. Frustoconical parts prevent any interference between the target holder 30 and the outer ring 18 of the bearing.

As will be described later, the target holder 30 also comprises lugs 36 in order to prevent angular movement relative to the inner ring 16 of the bearing.

In the disclosed example, the target holder 30 is made in one part. The target holder 30 may be made of metal or plastic, formed by stamping or by any other suitable process.

The sleeve 34 is axially secured to the inner ring 16. The sleeve 34 is mounted into the bore 16a of the inner ring of the bearing. The sleeve 34 is secured into the bore 16a. More precisely, the sleeve 34 is mounted and secured into the groove 16e of the bore. For example, the sleeve 34 may be secured into the bore 16a of the inner ring 16e, by axial press-fitting.

As previously mentioned, the sleeve 34 is axially secured to the inner ring 16. The sleeve 34 may also be angularly secured to the inner ring 16 to fasten in rotation the sleeve and inner ring 16. In this case, the sleeve 34 may be secured into the bore 16a by snapping, by gluing, by welding, by radial crimping or any other appropriate means.

The sleeve 34 comprises an annular axial portion 34a defining the bore of the sleeve, and an outer radial portion or collar 34b extending radially from the axial portion 34a. The collar 34b extends radially outwards from the axial portion 34a. The collar 34b extends an axial end of the axial portion 34a.

The target holder 30 is mounted radially around the axial portion 34a of the sleeve. The radial portion 30a of the target holder is mounted radially around the axial portion 34a. An annular radial gap (not referenced) subsists between the bore of the target holder 30 and the axial portion 34a of the sleeve. The axial portion 34a of the sleeve is secured to the inner ring 16 of the bearing. The axial portion 34a is mounted and secured into the bore 16a of the inner ring of the bearing. More precisely, the axial portion 34a of the sleeve is mounted and secured into the groove 16e of the bore.

The target holder 30 is axially interposed and clamped between the lateral face 16d of the inner ring and the radial collar 34b of the sleeve 34. The radial collar 34b axially abuts against the radial portion 30a of the target holder.

In the disclosed example, the sleeve 34 is made in one part. The sleeve 34 may be made of metal or plastic, formed by stamping or by any other suitable process.

The target 32 is mounted on the outer axial portion 30b of the target holder. In the disclosed example, the target 32 is mounted into the bore of the outer axial portion 30b. Alternatively, the target 32 may be mounted on the outer surface of the outer axial portion 30b.

In an embodiment, the target 32 includes magnetic North and South alternated poles. The target 32 is multi-polarly magnetized in the circumferentially direction. The target 32 may be a plastic molded part. The target 32 may be overmolded onto the target holder 30.

Alternatively, the target 32 may be separately formed and secured onto the target holder 30 by any appropriate means, for example by bonding or by press-fitting. The target 32 may be formed of a rubber material with magnetic powder, or of a magnetic alloy or of a plasto-ferrite or of an elasto-ferrite.

Detection means (not shown) are associated with the target 32 for tracking the rotation of the impulse ring 14 and the inner ring 16 around the axis X-X'. The detection means are disposed to radially face the inner surface of the target 32. For example, the detection means may include Hall-effect sensors. The target 32 is a radial target. Alternatively, the target may be an axial target.

As an alternative, the target 32 and the detection means may use any other suitable technology instead of magnetic technology. For example, induction technology or optic technology may be implemented.

As previously indicated, the target holder 30 comprises lugs 36 in order to form anti-rotations means. The lugs 36 extend from the radial portion 30a of the target holder towards the inner ring 16 of the bearing. The lugs 36 extend axially towards the inner ring 16.

Figure 2:
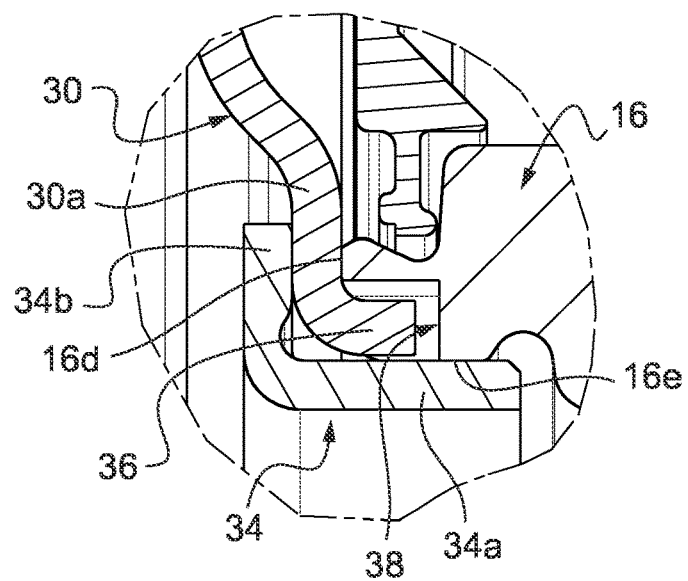
FIG. 2 is a detail view of FIG. 1.
Figure 3:
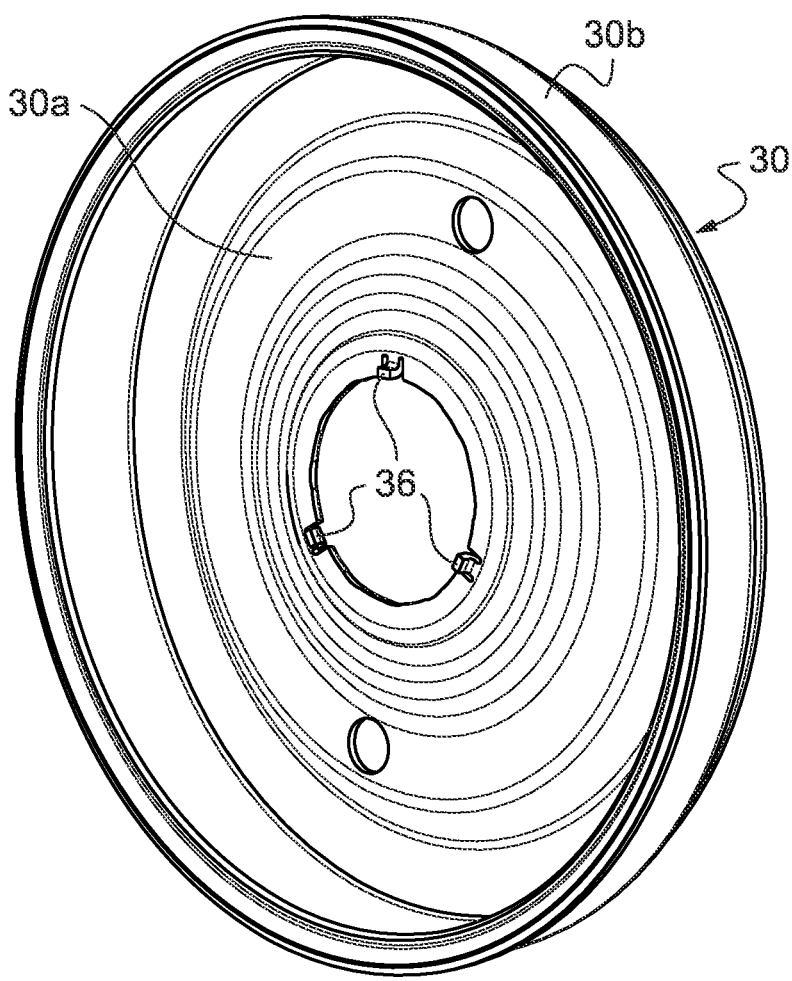
FIG. 3 is a perspective view of a target holder of an impulse ring of the sensor bearing unit of FIG. 1.

As shown more clearly on FIGS. 2 and 3, the lugs 36 extend the inner edge of the radial portion 30a of the target holder. The lugs 36 delimits together with the radial portion 30a the bore of the target holder. The lugs 36 are disposed around the axial portion 34a of the sleeve.

In the illustrated example, the target holder 30 comprises a plurality of lugs 36. The lugs 36 are identical to one another. The lugs 36 are spaced apart from each other in the circumferential direction, preferably regularly. Here, the target holder 30 comprises three lugs 36. Alternatively, the number of lugs may be at least equal to two. In another variant, the target holder 30 may comprise only one lug 36.

Each lug 36 of the target holder extends axially into a slot 38 formed on the lateral face 16d of the inner ring. Each slot 38 extends axially from the lateral face 16d into the thickness of the inner ring. Each slot 38 is oriented axially toward the radial portion 30a of the target holder. In the illustrated example, each slot 38 opens radially into the groove 16e of the bore. Alternatively, each slot 38 may not open radially into the groove 16e. In this case, a radial wall subsists between the groove 16e and each slot 38. The slot 38 are identical to one another.

Figure 4:
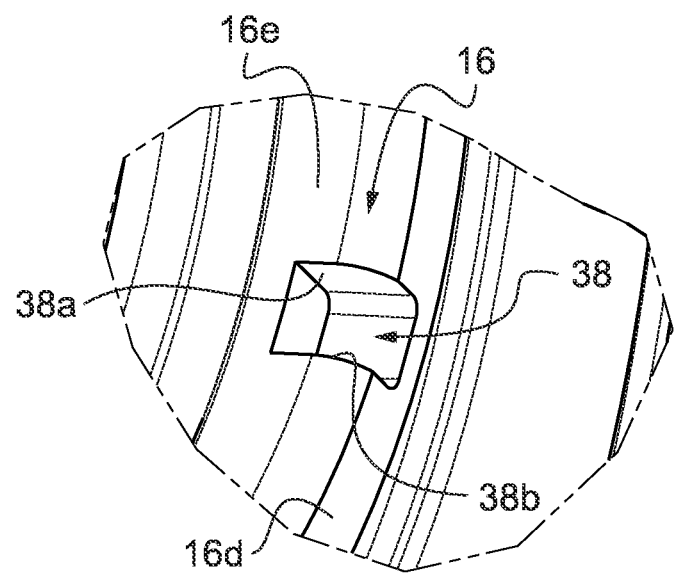
FIG. 4 is a detail view of a bearing of the sensor bearing unit of FIG. 1, FIGS. 5 and 6 are detail views of a sensor bearing unit according to a second example of the invention.

Each slot 38 extends in the circumferential direction over a limited angular sector. The circumferential dimension of each slot 38 is substantially equal to the one of the associated lug 36. Each slot 38 is provided with two lateral walls 38a, 38b (FIG. 4) facing each other in the circumferential direction. The lateral walls 38a, 38b delimit the slot in the circumferential direction.

Any relative rotation of the target holder 30 relative to the inner ring 16 is prevented by the abutment of each lug 36 with the lateral walls 38a, 38b of the associated slot 38.

The slots 38 of the inner ring form local anti-rotation means cooperating by circumferential contact with the lugs 36 of the target holder which form local complementary anti-rotation means.

Figure 5:
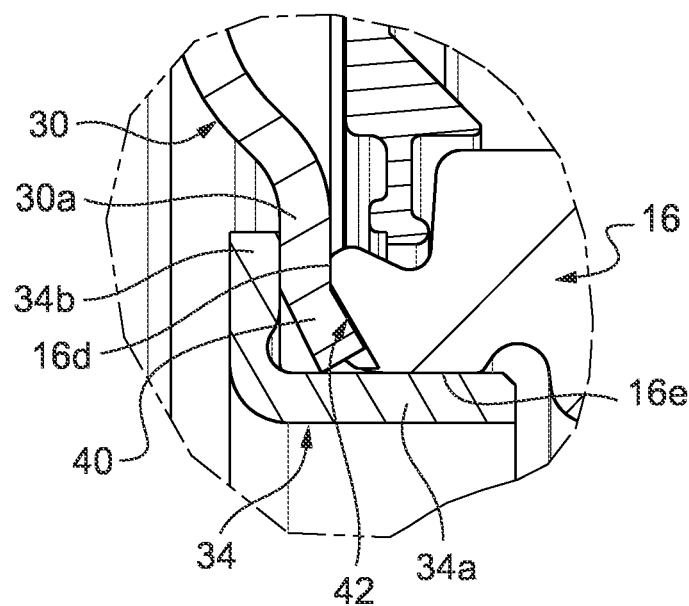
Figure 6:
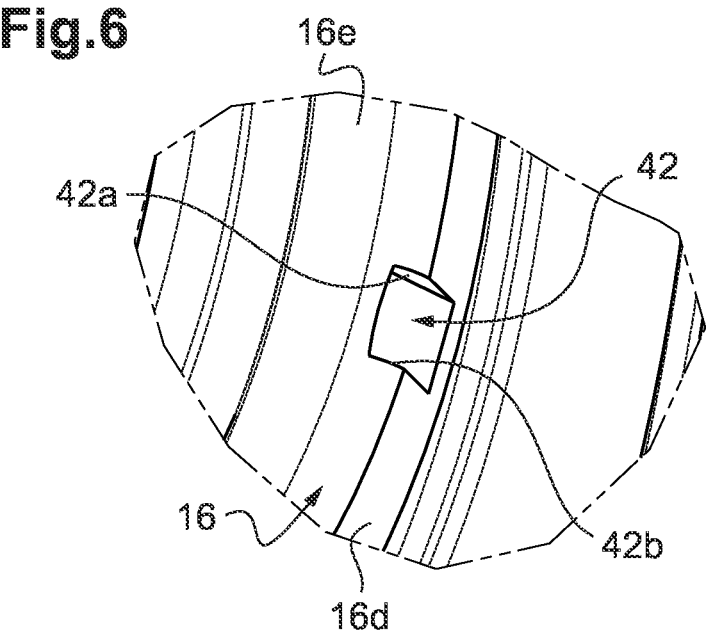

The second example shown on FIGS. 5 and 6, in which identical part are given identical references, differs from the first example in that the lugs 40 of the target holder 30 extends obliquely towards the inner ring 16 of the bearing rather than axially. Only the orientation of the lugs 40 differs from the first example.

Each lug 40 of the target holder extends into a slot 42 extending from the lateral face 16d of the inner ring. Each slot 42 extends obliquely inwards from the lateral face 16d. In the illustrated example, each slot 42 opens into the groove 16e of the bore.

Similarly, to the slots of the inner ring of the first example, each slot 42 extends in the circumferential direction over a limited angular sector. The circumferential dimension of each slot 42 is substantially equal to the one of the associated lug 40. Each slot 42 is provided with two lateral walls 42a, 42b facing each other in the circumferential direction. The lateral walls 42a, 42b delimit the slot in the circumferential direction.

The length of lugs 40 of the target holder 30 may be designed such that their free ends protrude into the thickness of the axial portion 34a of the sleeve. This further enhances the anti-rotation between the sleeve 34 and the target holder. Alternatively, it could be possible that the lugs 40 of the target holder remains spaced apart from the axial portion 34a of the sleeve. In this case, an annular radial gap subsists between the target holder 30 and the axial portion 34a of the sleeve.

Figure 7:
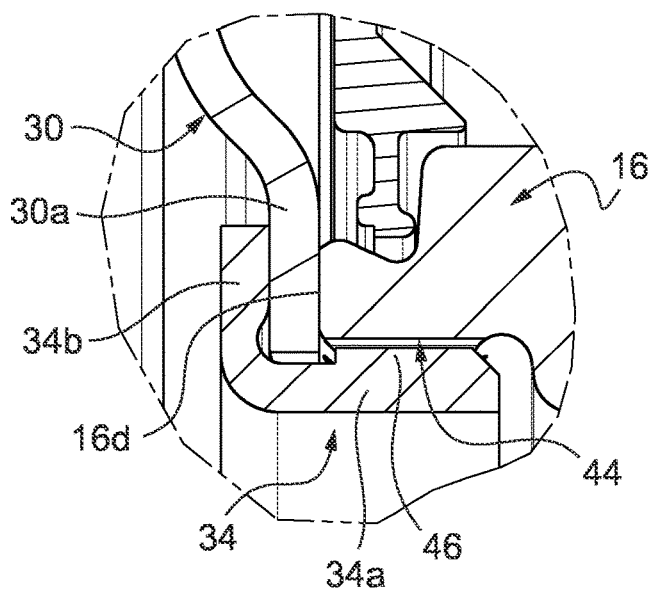
FIGS. 7 to 9 are detail views of a sensor bearing unit according to a third example of the invention.
Figure 8:
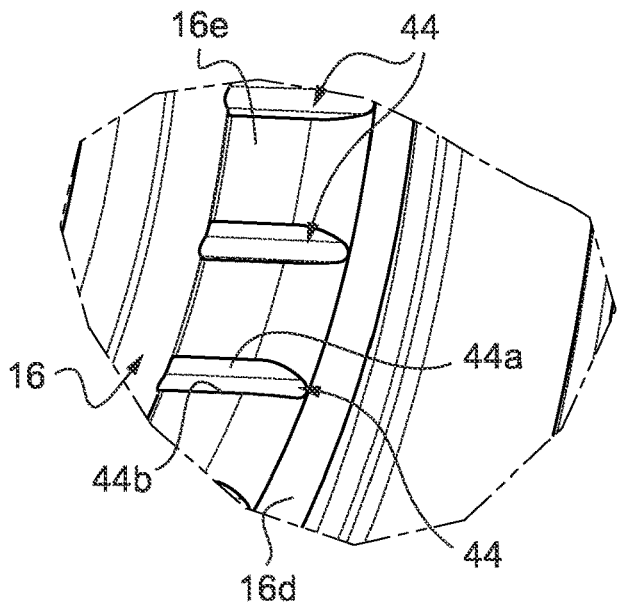
Figure 9:
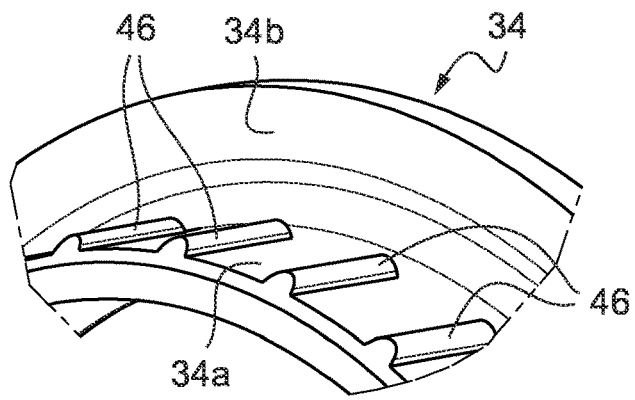

The third example shown on FIGS. 7 to 9, in which identical part are given identical references, differs from the previous examples in that the local anti-rotation means of the inner ring 16 cooperate with local anti-rotation means provided on the sleeve 34 of the impulse ring.

In this example, the anti-rotation means of the inner ring 16 comprises a plurality of axial grooves 44 extending from the lateral face 16d of the inner ring axially along the cylindrical groove 16e of the bore. Each groove 44 is oriented radially toward the axial portion 34a of the sleeve. The grooves 44 are spaced apart from each other in the circumferential direction, preferably regularly.

Each groove 44 extends in the circumferential direction over a limited angular sector. Each groove 44 is provided with two lateral walls 44a, 44b facing each other in the circumferential direction. The lateral walls 44a, 44b delimit the groove in the circumferential direction.

The sleeve 34 comprises a plurality of axial bosses 46 each extending radially into one of the axial grooves 44 and being of complementary shape. The bosses 46 form the anti-rotation means of the sleeve 34. The bosses 46 extends outwards from the axial portion 34a of the sleeve. The bosses 46 extends outwards from the outer surface of the axial portion 34a. The bosses 46 protrude radially outwards. The bosses 46 extend axially along the axial portion 34a of the sleeve.

Any relative rotation of the sleeve 34 relative to the inner ring 16 is prevented by the abutment in the circumferential direction of each boss 46 with the lateral walls 44a, 44b of the associated groove.

In the illustrated example, the inner ring 16 and the sleeve 34 respectively comprise a plurality of axial grooves 44 and bosses 46. Alternatively, the inner ring 16 and the sleeve may comprise only one groove 44 and one boss 46.

Figure 10:
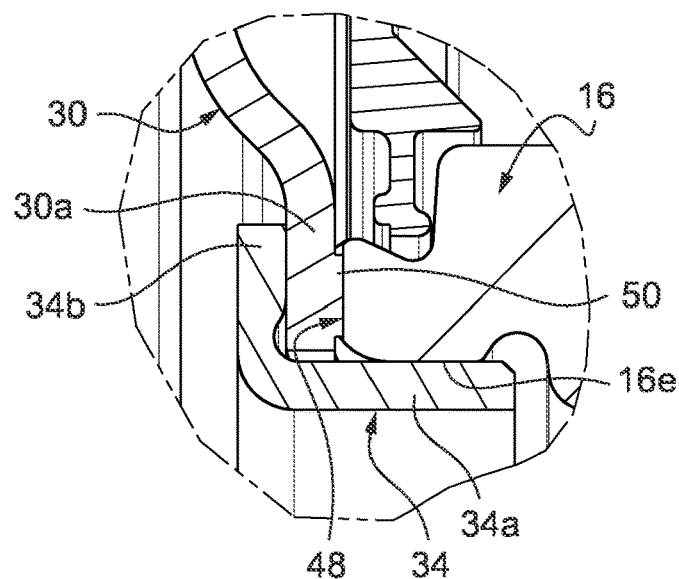
FIGS. 10 to 12 are detail views of a sensor bearing unit according to a fourth example of the invention.
Figure 11:
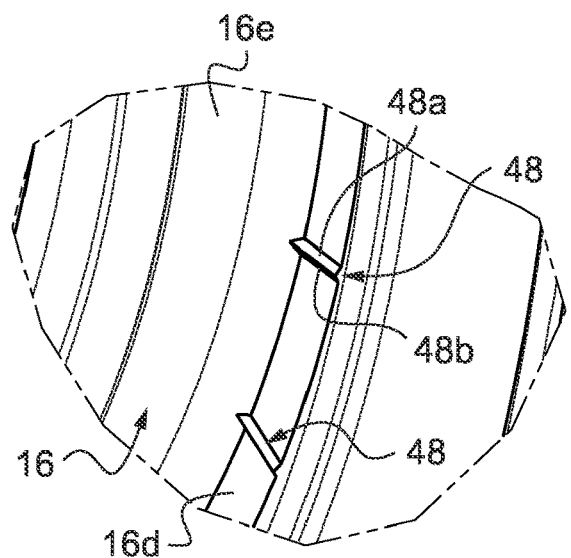
Figure 12:
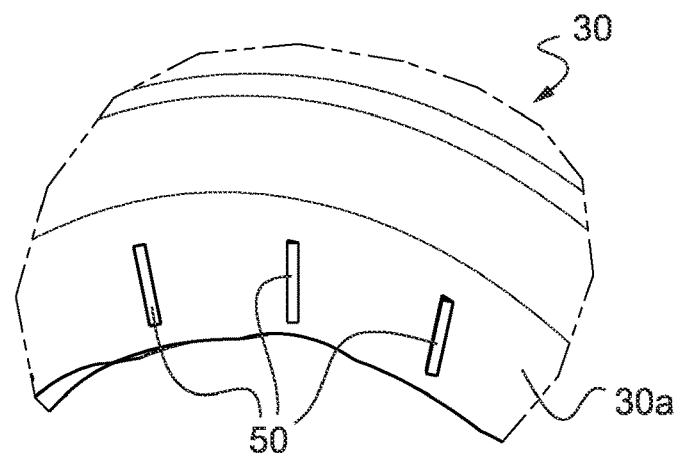

In the fourth example shown on FIGS. 10 to 12, in which identical part are given identical references, the anti-rotation means of the inner ring 16 comprise a plurality of radial grooves 48 formed on the lateral face 16d of the inner ring. Each groove 48 extends radially on the lateral face 16d. Each groove 48 is oriented axially toward the radial portion 30a of the target holder. The grooves 48 are spaced apart from each other in the circumferential direction, preferably regularly.

Each groove 48 extends in the circumferential direction over a limited angular sector. Each groove 48 is provided with two lateral walls 48a, 48b facing each other in the circumferential direction. The lateral walls 48a, 48b delimit the groove in the circumferential direction.

The target holder 30 comprises a plurality of radial bosses 50 each extending axially into one of the radial grooves 48 and being of complementary shape. The bosses 50 form the anti-rotation means of target holder 30. The bosses 50 extends outwards from the radial portion 30a of the target holder. The bosses 50 protrudes axially. The bosses 50 extend radially along the radial portion 30a of the target holder.

Any relative rotation of the target holder 30 relative to the inner ring 16 is prevented by the abutment in the circumferential direction of each boss 50 with the lateral walls 48a, 48b of the associated groove.

In the illustrated example, the inner ring 16 and the target holder 30 respective comprise a plurality of axial grooves 48 and bosses 50. Alternatively, the inner ring 16 and the target holder 30 may comprise only one groove 48 and one boss 50.

Figure 13:
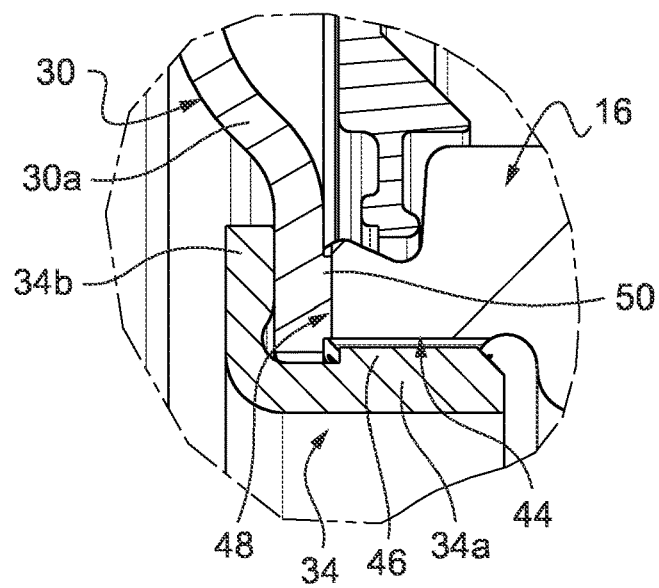
FIGS. 13 to 15 are detail views of a sensor bearing unit according to a fifth example of the invention.
Figure 14:
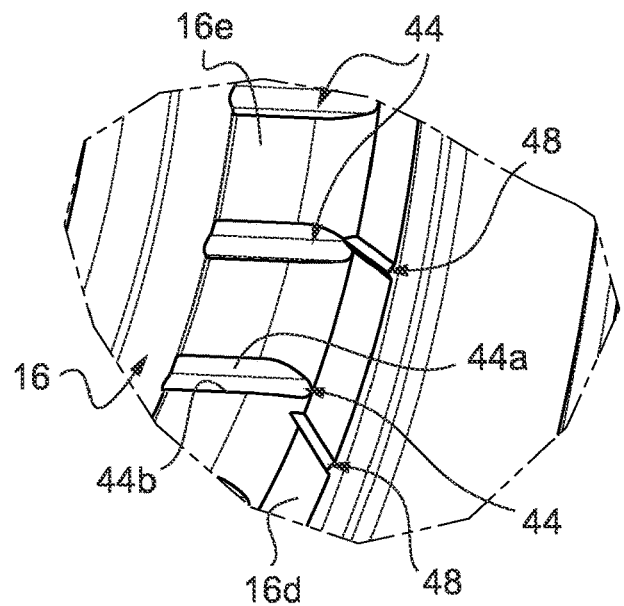
Figure 15:
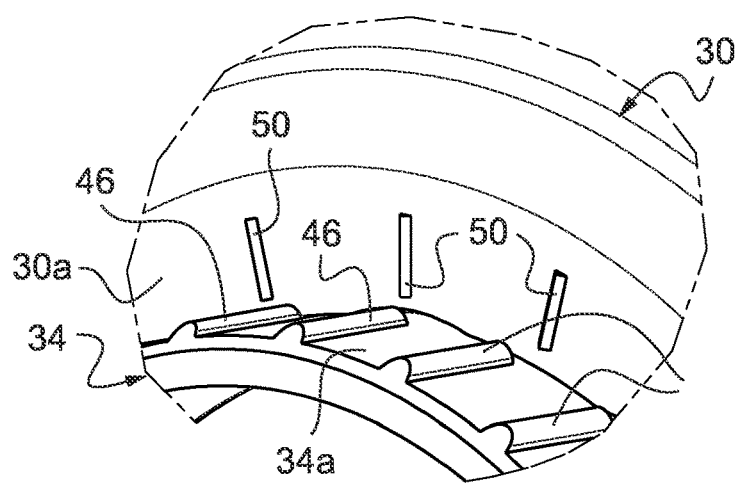

In the fifth example shown on FIGS. 13 to 15, in which identical part are given identical references, the inner ring 16 of the bearing comprises the axial grooves 44 and radial grooves 48 as disclosed in the third and fourth examples. The sleeve 34 and the target holder 30 also respectively comprise the bosses 46, 50.

Figure 16:
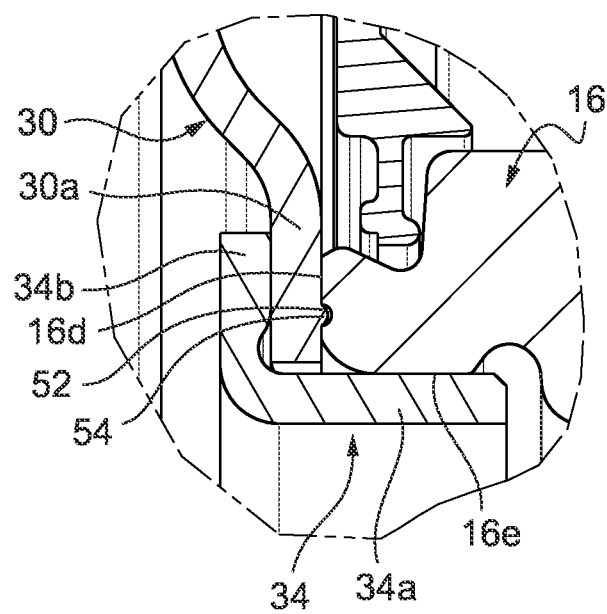
FIG. 16 is a detail view of a sensor bearing unit according to a sixth example of the invention.

In the sixth example shown on FIG. 16, in which identical part are given identical references, the inner ring 16 of the bearing comprise an annular eccentric groove 52 formed on the lateral face 16d of the inner ring. The center of the eccentric groove 52 is radially offset with the rotation axis of the bearing. The eccentric groove 52 is oriented axially toward the radial portion 30a of the target holder.

The target holder 30 comprises an annular eccentric rib 54 extending axially into the eccentric groove 52 and being of complementary shape. The rib 54 extends outwards from the radial portion 30a of the target holder. The rib 54 protrudes axially.

Any relative rotation of the target holder 30 relative to the inner ring 16 is prevented by wedging of the eccentric rib 54 into the eccentric groove 52.

The eccentric groove 52 of the inner ring form annular anti-rotation means cooperating by wedging with the eccentric rib 54 of the target holder which form annular complementary anti-rotation means.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Otherwise, as previously mentioned, in these illustrated examples, the first ring of the rolling bearing is the inner ring whereas the second ring is the outer ring. As an alternative, it could be possible to provide a reversed arrangement with the first ring forming the outer ring and the second ring forming the inner ring. In this case, the target holder is secured to the outer ring.

The invention claimed is:

1. A sensor bearing unit comprising:
    a bearing having a first ring and a second ring centered on an axis, and
    an impulse ring provided with a target holder, with a target mounted on the target holder, and with a sleeve secured to the first ring of the bearing, the target holder being axially mounted between a lateral face of the first ring of the bearing and the sleeve, wherein
    the first ring of the bearing comprises anti-rotation means cooperating with complementary anti-rotation means of the impulse ring so as to prevent angular movement of the impulse ring relative to the first ring, the anti-rotation means of the first ring of the bearing being formed on the lateral face of the first ring and/or extending from the lateral face, the complementary anti-rotation means of the impulse ring extending into the anti-rotation means of the first ring or vice versa.

2. The sensor bearing unit according to claim 1, wherein the anti-rotation means of the first ring of the bearing and the complementary anti-rotation means of the impulse ring extend in the circumferential direction over a limited angular sector.

3. The sensor bearing unit according to claim 1, wherein the sleeve comprises a mounting portion secured to the first ring of the bearing which extends purely axially.

4. The sensor bearing unit according to claim 1, wherein a radial gap subsists between the bore of the target holder of the impulse ring and the sleeve.

5. The sensor bearing unit according to claim 1, wherein the anti-rotation means of the first ring of the bearing comprise at least one anti-rotation recessed portion.

6. The sensor bearing unit according to claim 5, wherein the anti-rotation recessed portion comprises at least one slot formed on the lateral face of the first ring of the bearing, the target holder of the impulse ring comprising at least one lug extending into the slot, the lug forming at least partly the complementary anti-rotation means of the impulse ring.

7. The sensor bearing unit according to claim 5, wherein the anti-rotation recessed portion comprises at least one axial groove extending from the lateral face of the first ring of the bearing axially along a cylindrical surface of the first ring, the sleeve comprising at least one boss extending into the axial groove and being of complementary shape, the boss forming at least partly the complementary anti-rotation means of the impulse ring.

8. The sensor bearing unit according to claim 5, wherein the anti-rotation recessed portion comprises at least one radial groove formed on the lateral face of the first ring of the bearing, the target holder comprising at least one boss extending into the radial groove and being of complementary shape, the boss forming at least partly the complementary anti-rotation means of the impulse ring.

9. The sensor bearing unit according to claim 5, wherein the anti-rotation recessed portion comprises an eccentric groove formed on the lateral face of the first ring of the bearing, the target holder comprising an eccentric rib extending into the eccentric groove and being of complementary shape, the eccentric rib forming at least partly the complementary anti-rotation means of the impulse ring.

10. A method for manufacturing a sensor bearing unit comprising:
    providing a bearing having a first ring and a second ring centered on an axis, and
    an impulse ring provided with a target holder, with a target mounted on the target holder, and with a sleeve secured to the first ring of the bearing, the target holder being axially mounted between a lateral face of the first ring of the bearing and the sleeve, wherein
    the first ring of the bearing comprises anti-rotation means cooperating with complementary anti-rotation means of the impulse ring so as to prevent angular movement of the impulse ring relative to the first ring, the anti-rotation means of the first ring of the bearing being formed on the lateral face of the first ring and/or extending from the lateral face, the complementary anti-rotation means of the impulse ring extending into the anti-rotation means of the first ring or vice versa, and
    securing the sleeve to the first ring by axial press-fitting.

* * * * *